Sept. 8, 1942. H. BROWN ET AL 2,295,026
FORCE MEASURING DEVICE
Filed June 5, 1939
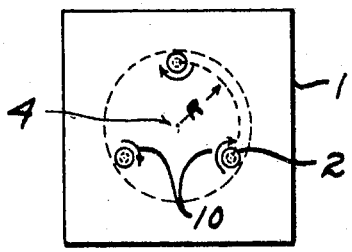
Fig.1.
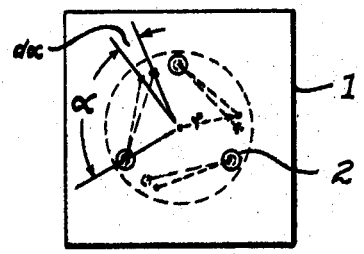
Fig.3.
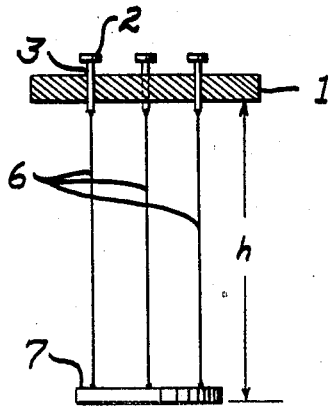
Fig.2.
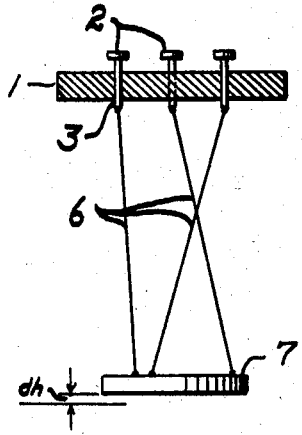
Fig.4.
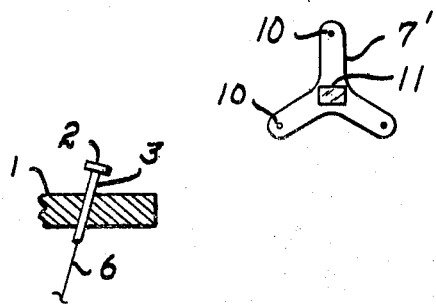
Fig.5.
Fig.6.
HART BROWN
JOHN H. MARTIN
INVENTOR.
BY Jesse R. Stone
Lester B. Clark
ATTORNEYS Patented Sept. 8, 1942

2,295,026

UNITED STATES PATENT OFFICE 2,295,026

FORCE MEASURING DEVICE

Hart Brown and John H. Martin, Houston, Tex.

Application June 5, 1939, Serial No. 277,514

7 Claims. (Cl. 265—1.4)

The invention relates to instruments for measuring variations in a force and is of particular utility in the field of gravimetric measurements in the art of geophysical prospecting for subterranean structures favorable to the location of valuable deposits.

An object of this invention is to arrange a mass suspended by a multifilar torsion-tension suspension system in such a manner that the sensitivity of the system to desired forces can be adjusted to high values, and such that the sensitivity of the system to undesirable forces and to undesirable oscillations can be minimized.

It is also an object to provide a force responsive instrument which is capable of measuring changes in the magnitude of a force regardless of the nature of such force.

Another object is to provide an instrument which is capable of measuring minute changes in force with an extremely high degree of accuracy.

A particular object of the invention is to use a multifilar torsion-tension suspension system consisting of three strands, the ends of which are supported nonlinearly so as to limit the degrees of freedom of the suspended mass and thus to minimize unwanted oscillations of that mass.

Still another object is to provide a device having a multifilar suspension in which supporting strands are arranged about a common point in the force responsive system.

Still another object is to provide a measuring instrument for measuring changes in gravimetric force by the effect produced by such force on a gravity responsive member supported by a plurality of suspension torsion strands attached thereto.

A more specific object is to provide an instrument including a support and a force responsive member, the latter being supported by a plurality of suspension-torsion strands the ends of which are attached to the supporting member and the force responsive member in non-linear array about a point in each of such members, means being provided for subjecting some or all of the strands to torsion whereby differential displacement of the force responsive member is a measure of the change in the force producing such displacement.

A still more specific object is to provide an instrument including a support, to which are fastened three strands positioned symmetrically about and equi-distant from a central point, a mass to which the lower end of the strands are attached at three points symmetrically located about and equi-distant from a central point on the mass, and means for developing torsion in each of the three strands so that the mass is rotated until it approaches a point of unstable equilibrium, thereby constituting an instrument of high sensitivity and one which is suitable for gravimetric measurements.

One form which this invention takes when only three strands are used and in which symmetry is featured, will be apparent from the following description taken in connection with the drawing in which:

Fig. 1 is a plan view of the construction embodying the invention.

Fig. 2 is a side elevational view of the construction shown in Fig. 1.

Fig. 3 is a plan view similar to that shown in Fig. 1 but illustrating the relative position of parts when torsion is applied to the strands supporting the force responsive member.

Fig. 4 is a side elevational view of the construction shown in Fig. 3.

Fig. 5 is a plan view of a spider type of force responsive member.

Fig. 6 is a fragmentary view illustrating an alternate manner of attaching the suspension-torsion strands to the support.

Since the invention is of primary utility in measuring small changes in the force of gravity, it will be described in connection with the making of such measurements altho it is to be understood that such description is illustrative only as the invention contemplates an instrument which is capable of measuring, with extreme accuracy, changes in the force whether such force be magnetic, electrostatic, gravimetric or otherwise or a combination of such forces.

In providing such a device the illustrated embodiment of the invention comprises a support member 1. This member is stationary and is provided with a plurality of knobs 2 which are rotatably mounted thereon and which are provided with stems 3 extending a part or all of the way thru the support. The knobs 2 are arranged symmetrically about the point 4 and are equidistant therefrom a distance R.

Suspension-torsion strands 6 are attached to the lower ends of the stems 3 and extend downwardly therefrom. These strands may be of metal or other suitable material, as for example quartz, and may comprise ribbons, rods, tubes, or other structural shapes of such material, the principal requisite being that they shall possess desired characteristics including sufficient tensile and torsional strength that the instrument will effectively serve the purpose for which designed.

The lower ends of the strands 6 are attached to a mass or gravity responsive member 7 which is shown in Figs. 2 and 4 as a disc. In this particular embodiment of this invention, the three strands are all of equal length so that member 7 is supported a distance $h$ from the support member 1 and in parallel relation thereto. The points of attachment of the strands to the member 7 are symmetrically located about a central point therein and spaced equidistant therefrom, a distance $r$ from the center. Although in the drawing the distance R is shown the same as the distance $r$, it is to be understood that the invention is not confined thereto but broadly comprehends inequality in R and $r$ and either may be the larger.

Any one or all of the knobs 2 are rotated, for example, in a clockwise direction as indicated by the arrows 10 in Fig. 1, the gravity responsive member 7 will rotate thru an angle $\alpha$ as indicated in Fig. 3. It is obvious that the angle $\alpha$ will depend upon the summation of the torques applied by the strands 6. At the same time the member 7 will be lifted an increment $dh$ and the relative position of parts will then be as shown in Fig. 4.

If sufficient torque be applied to the strands 6 the angle $\alpha$ will become sufficiently great that a condition of unstability is approached. If then the force tending to return the member 7 to a lower position varies by a small amount, a material change in the rotational deflection of the member 7 will take place. This change in deflection is indicated as $\partial\alpha$ in Fig. 3 of the drawing and the amount of this differential deflection is a measurement of the change in the force acting upon the member 7 and producing such change.

The change in the force may obviously be determined by the angular deflection $\partial\alpha$. Other methods and devices may, however, be relied upon for obtaining the desired data. For example an indication of the change in $dh$ may be utilized or, a null method of making observations may be utilized. This may be accomplished thru a force exerted by mechanical means or by an electrostatic or magnetic force acting upon the member 7 and of sufficient amplitude to return the member to a null position. The amount of the restoring force necessary to effect such movement of the gravity responsive member 7 is thus a measure of the change in force causing the member to deviate from the null position.

The gravity responsive member 7, illustrated as a disc, may be made in various other forms such as a ring or a spider, as shown as 7' in Fig. 5. In this embodiment the lower ends of the strands are attached at the points 10. Mounted centrally of the member 7' is shown a mirror 11 which may be utilized to provide an optical lever whereby a very slight angular movement may be accurately determined. Alternately, of course, the mirror may be used when accurately returning the member 7' to the null position as above described.

When the instrument is adjusted for normal operating conditions each of the strands 6 extends diagonally downward from its supporting stem 3. If then for purposes of adjustment the torsion in the strand is to be increased or decreased the rotation of the knob 2 for such adjustment will effect the desired change. During rotation of the knob 2, however, the strand is caused to flex at its point of attachment to the stem 3. Such flexure sets up undesirable stresses in the strand. This undesirable feature may be avoided in accordance with the fragmentary view of Fig. 6, wherein the knob 2 and its associated stem are shown as rotatably mounted in the support 1 in alinement with the strand 6 which extends in the direction assumed when the instrument is adjusted for normal operation.

The mode of operation of the described construction seems apparent but reference will be made thereto by way of summary directed to the use of the instrument in the determination of small changes of gravimetric force $g$. The knobs 2 are turned sufficiently that the member 7 is rotated thru an angle $\alpha$ to acquire the desired sensitivity. Suitable clamping means are provided (not shown) for holding the member 7 in a fixed position during transportation of the instrument so as to avoid undesirable effects that would result from any impacts to which the instrument might be subjected.

A datum point is established by unclamping the member 7 and observing the deflection at that point. The instrument is successively clamped during transportation between other points in an area to be prospected. At each point of observation the change effected by the change in gravity of that point from the established point is noted and finally a check observation is made upon the initially established point in order to ascertain any trend which may have taken place in the instrument. By making observations at a suitable number of points within the area of prospecting, a contour map may be drawn, such map indicating from the gravimetric measurements the location and extent of anomalous subsurface structures.

Altho the form of the invention described above calls for three torsion-tension strands, the invention may be practiced by the use of three or more such strands. Likewise this construction may carry equal torsion and/or equal tension as is the case where a perfectly symmetrical arrangement is used but this equality of tension or torsion is not a necessary condition to the practice of the invention. Also the strands which are used may all be of the same material but they may be of different materials. For example certain advantages accrue from the use of strands having different torsion constants and it is intended that the invention shall include such practice.

In the preferred embodiment illustrated as described the strands 6 are shown of uniform length. Again it is to be understood that such proportioning of parts is not necessary to the practice of the invention.

The knobs 2 have been shown arranged symmetrically about the point 4, that is 120° apart, and each at a distance R from the central point. Altho this symmetrical arrangement has certain advantages it is also to be distinctly understood that the invention may be practiced with asymmetrical arrangement in order to take advantage of the benefits resulting from the asymmetry. Such departure from the specific disclosure also applies to the arrangement of the points of attachment to the force responsive member 7.

Broadly the invention comprehends a means of measuring small increments of force, such instrument comprising a force responsive member which is supported by a multifilar suspension of tension-torsion strands which are so arrayed as to minimize unwanted oscillations of the moving system and which at the same time provides an instrument having a sufficiently high degree of accuracy to measure minute changes in the force to be measured.

What is claimed is:

1. A force measuring device comprising a support, a trifilar suspension comprising three rotatable members mounted on the support symmetrically about a point thereon, a suspension strand carried axially of each of said members, and a force responsive member supported by said strands, certain of said strands being twisted whereby the force responsive member is rotated to a position of equilibrium by the torque.

2. A force measuring device comprising a support, a trifilar suspension comprisng three strands attached to the support in non-linear spaced relation, a force responsive member supported by the strands, and means for developing a torsional force in each of the strands whereby the force responsive member is rotated through an angle which is a measure of the forces acting on the member.

3. A device of the character described comprising a support, a plurality of members rotatably mounted thereon in nonlinear spaced relation, a suspension-torsion strand attached to each of said rotatable members, and a force responsive member attached to said strands and supported thereby, whereby the force responsive member is rotated to a position of equilibrium determined by the forces acting on such member.

4. An instrument for measuring variations in the value of the acceleration of gravity comprising a mass, at least three suspension strands supporting said mass at separate points on a horizontal plane, said points being located at the vertices of a regular polygon having its center at the intersection between said plane and a vertical line passing through the center of gravity of said mass, and means for twisting each of said strands.

5. An instrument for measuring variations in the value of the acceleration of gravity comprising a mass solely and substantially equally supported by three suspension strands of substantially equal length and physical properties at points in the same horizontal plane and equidistant from each other, a support, and three members rotatably mounted on said support, each of said members having the upper end of one of said strands axially affixed thereto and being located so that said strands when free from torsional stress assume substantially vertical positions.

6. An instrument for measuring variations in the value of the acceleration of gravity comprising a mass, at least three suspension strands supporting said mass at separate points on a horizontal plane, said points being located at the vertices of a regular polygon having its center at the intersection between said plane and a vertical line passing through the center of gravity of said mass, and means for twisting each of said strands.

7. An instrument for measuring variations in the value of the acceleration of gravity comprising a mass solely and substantially equally supported by three suspension strands of substantially equal length and physical properties at points in the same horizontal plane and equidistant from each other, a support, and three members rotatably mounted on said support, each of said members having the upper end of one of said strands axially affixed thereto and being located so that said strands when free from torsional stress assume substantially vertical positions.

HART BROWN.
JOHN H. MARTIN.